United States Patent
Ou et al.

(10) Patent No.: US 11,570,530 B2
(45) Date of Patent: Jan. 31, 2023

(54) METHOD AND APPARATUS FOR SWITCHING LINE BANDWIDTH OF OPTICAL TRANSPORT NETWORK

(71) Applicant: HUAWEI TECHNOLOGIES CO., LTD., Guangdong (CN)

(72) Inventors: Sisi Ou, Chengdu (CN); Zhangwei Lei, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/353,373

(22) Filed: Jun. 21, 2021

(65) Prior Publication Data

US 2021/0314682 A1    Oct. 7, 2021

Related U.S. Application Data

(63) Continuation of application No. PCT/CN2019/100649, filed on Aug. 14, 2019.

(30) Foreign Application Priority Data

Dec. 21, 2018   (CN) .......................... 201811572644.2

(51) Int. Cl.
   *H04J 3/16*   (2006.01)
   *H04Q 11/00*  (2006.01)

(52) U.S. Cl.
   CPC ........ *H04Q 11/0062* (2013.01); *H04J 3/1652* (2013.01); *H04J 2203/0007* (2013.01); *H04Q 2011/0086* (2013.01)

(58) Field of Classification Search
   CPC .......................... H04Q 11/0062; H04J 3/1652
   See application file for complete search history.

(56) References Cited

U.S. PATENT DOCUMENTS

| | | | |
|---|---|---|---|
| 9,231,721 B1 | 1/2016 | Varadarajan et al. | |
| 2015/0104178 A1* | 4/2015 | Su | H04J 3/1652 398/79 |
| 2017/0324657 A1* | 11/2017 | Zhong | H04L 45/66 |

FOREIGN PATENT DOCUMENTS

| | | |
|---|---|---|
| CN | 102257834 A | 11/2011 |
| CN | 102870434 A | 1/2013 |

(Continued)

OTHER PUBLICATIONS

"ODUflex in Detail: Transporting Any Client Signal in the OTN", EXAR Corporation, 2011 (Year: 2011).*

(Continued)

*Primary Examiner* — Shi K Li
(74) *Attorney, Agent, or Firm* — Fish & Richardson P.C.

(57) ABSTRACT

The present disclosure discloses example method and apparatus for switching a line bandwidth of an optical transport network. One example method includes a network device switching an optical transport network (OTN) frame from a first bandwidth to a second bandwidth at a granularity of a substructure to generate a first OTN frame with the second bandwidth, where a bandwidth of the substructure is a specified value, and a difference between the first bandwidth and the second bandwidth is a multiple of the specified value. The first OTN frame with the second bandwidth is encapsulated as an encapsulated frame with the second bandwidth according to a first encapsulation protocol. The encapsulated frame with the second bandwidth is transmitted at an optical layer.

14 Claims, 9 Drawing Sheets

(56) References Cited

FOREIGN PATENT DOCUMENTS

| CN | 102884808 A | 1/2013 |
|----|-------------|--------|
| CN | 104885385 A | 9/2015 |
| CN | 105451102 A | 3/2016 |
| CN | 108632061 A | 10/2018 |
| EP | 2472748 A1 | 7/2012 |
| EP | 2566118 A1 | 3/2013 |
| EP | 2779491 A1 | 9/2014 |
| EP | 2852177 A1 | 3/2015 |
| EP | 3242430 A1 | 11/2017 |

OTHER PUBLICATIONS

Steve Gorshe, "The Evolution of ITU-T G.709: Optical Transport Networks (OTN) Beyond 100Gbit/s", Microsemi Corp., 2017 (Year: 2017).*
Extended European Search Report issued in European Application No. 19898373.6 dated Jan. 4, 2022, 8 pages.
Office Action issued in Chinese Application No. 201811572644.2, dated Nov. 19, 2020, 8 pages (With Partial English Translation).
PCT International Search Report and Written Opinion in International Application No. PCT/CN2019/100649, dated Nov. 13, 2019, 15 pages (With English Translation).

* cited by examiner

| Overhead | TS 1.1 | TS 2.1 | ... | TS 20.1 | TS 1.2 | ... | TS 20.2 | ... | TS 20.n |

ODUC1

FIG. 6

METHOD AND APPARATUS FOR SWITCHING LINE BANDWIDTH OF OPTICAL TRANSPORT NETWORK

CROSS-REFERENCE TO RELATED APPLICATIONS

This application is a continuation of International Application No. PCT/CN2019/100649, filed on Aug. 14, 2019, which claims priority to Chinese Patent Application No. 201811572644.2, filed on Dec. 21, 2018. The disclosures of the aforementioned applications are hereby incorporated by reference in their entireties.

TECHNICAL FIELD

Embodiments of this application relate to the communications field, and in particular, to a method and an apparatus for switching a line bandwidth of an optical transport network.

BACKGROUND

As a core technology of a next-generation transport network, an optical transport network (OTN) is a transport network in which a network is organized at an optical layer based on a wavelength division multiplexing technology. The OTN includes technical specifications of an electrical layer and an optical layer. The OTN uses optical fibers as a transmission medium for transmission of large-capacity services. For example, an optical transport network shown in FIG. 1 includes a plurality of network devices (NE) and client-side devices. Different network devices perform signal transmission through optical fibers, and signal transmission can be performed between the network devices and the client-side devices through Ethernet or the like. The network devices are configured to perform data transmission between the network devices through optical fibers, where data is from the client-side devices, so that the network devices finally transmit the data to another client-side device. Generally, a line-side bandwidth is used to describe a rate of signal transmission between network devices through optical fibers. A bandwidth level of an OTN line side may be generally 2.5 gigabits per second (Gbit/s), 10 Gbit/s, 40 Gbit/s, 100 Gbit/s, n*100 Gbit/s, or the like.

In actual application, the line-side bandwidth is not fixed, and bandwidth switching needs to be performed depending on specific service requirements. Currently, line bandwidth switching is performed as follows: A new line-side bandwidth is set after service transmission is interrupted, and then service transmission continues. For example, if a current bandwidth level for transmission is 100 Gbit/s, and the bandwidth level needs to be increased to 200 Gbit/s, service transmission needs to be interrupted first, and services are restored after the bandwidth level of service transmission is increased to 200 Gbit/s. If a current bandwidth level for optical-layer transmission is 200 Gbit/s, and the bandwidth level needs to be decreased to 100 Gbit/s, service transmission needs to be interrupted first, and services are restored after the bandwidth level of service transmission is decreased to 100 Gbit/s. It can be learned that line bandwidth switching efficiency is relatively low at present.

SUMMARY

Embodiments of this application provide a method and an apparatus for switching a line bandwidth of an optical transport network, to improve bandwidth switching efficiency.

According to a first aspect, a method for switching a line bandwidth of an optical transport network is provided. The method is applicable to the optical transport network. The optical transport network includes a plurality of network devices. The method includes: The network device switches a first optical transport network OTN frame from a first bandwidth to a second bandwidth at a granularity of a substructure, where a bandwidth of the substructure is a specified value, and a difference between the first bandwidth and the second bandwidth is one or more specified values. The network device encapsulates a first OTN frame with the second bandwidth according to a first encapsulation protocol, and transmits the encapsulated frame with the second bandwidth at an optical layer. According to this embodiment of this application, data transmission can be performed at a relatively small-granularity bandwidth level on a line side, and further flexible bandwidth switching can be implemented. This improves bandwidth switching efficiency and service communication efficiency.

In a possible implementation, that the network device switches a first optical transport network OTN frame from a first bandwidth to a second bandwidth at a granularity of a substructure includes: The network device determines a second OTN frame, where the second OTN frame is a frame with a third bandwidth, and the second OTN frame is generated by the network device based on first service data from a client side according to a second encapsulation protocol. The network device switches a bandwidth of a third encapsulation protocol from the first bandwidth to the second bandwidth at a granularity of the specified value. The network device maps a payload of the second OTN frame to a payload of the substructure of the first OTN frame according to the third encapsulation protocol, maps an overhead of the second OTN frame to an overhead of the first OTN frame according to the third encapsulation protocol, and fills the substructure of the first OTN frame with an invalid byte according to the third encapsulation protocol, so that a ratio of the overhead or the invalid byte included in each substructure to the payload is a fixed ratio. According to this embodiment of this application, conversion is performed an OTN frame generated according to an OTN line processing protocol, and lossless bandwidth switching can be implemented during the conversion. This improves switching efficiency.

In another possible implementation, the first OTN frame is generated by the network device based on the first service data from a client side according to a fourth encapsulation protocol. That the network device switches a first optical transport network OTN frame from a first bandwidth to a second bandwidth at a granularity of a substructure includes: The network device switches a bandwidth of the fourth encapsulation protocol from the first bandwidth to the second bandwidth at a granularity of the specified value. The network device maps the first service data to a payload of the substructure of the first OTN frame according to the fourth encapsulation protocol, and fills the substructure of the first OTN frame with an overhead or an invalid byte according to the fourth encapsulation protocol, so that a ratio of the overhead or the invalid byte included in each substructure to the payload is a fixed ratio.

In another possible implementation, when the first bandwidth is greater than the second bandwidth, after the network device switches the first optical transport network OTN frame from the first bandwidth to the second bandwidth at the granularity of the substructure, the method further includes:

the network device switches the first encapsulation protocol and the optical layer from the first bandwidth to the second bandwidth.

In another possible implementation, when the first bandwidth is less than the second bandwidth, before the network device switches the first optical transport network OTN frame from the first bandwidth to the second bandwidth at the granularity of the substructure, the method further includes:

the network device switches the first encapsulation protocol and the optical layer from the first bandwidth to the second bandwidth.

In another possible implementation, the specified value is 25 gigabits per second. The first bandwidth is an integer multiple of 100 gigabits per second, and the second bandwidth is an integer multiple of 100 gigabits per second.

According to a second aspect, an apparatus for switching a line bandwidth of an optical transport network is provided. The apparatus is used in a network device in the optical transport network. The apparatus includes:

a first switching unit, configured to switch a first optical transport network OTN frame from a first bandwidth to a second bandwidth at a granularity of a substructure, where a bandwidth of the substructure is a specified value, and a difference between the first bandwidth and the second bandwidth is one or more specified values; and a first sending unit, configured to encapsulate a first OTN frame with the second bandwidth according to a first encapsulation protocol, and send the encapsulated frame with the second bandwidth at an optical layer.

In a possible implementation, the first switching unit is specifically configured to:

determine a second OTN frame, where the second OTN frame is a frame with a third bandwidth, and the second OTN frame is generated by the network device based on first service data from a client side according to a second encapsulation protocol;

switch a bandwidth of a third encapsulation protocol from the first bandwidth to the second bandwidth at a granularity of the specified value; and map a payload of the second OTN frame to a payload of the substructure of the first OTN frame according to the third encapsulation protocol, map an overhead of the second OTN frame to an overhead of the first OTN frame according to the third encapsulation protocol, and fill the substructure of the first OTN frame with an invalid byte according to the third encapsulation protocol, so that a ratio of the overhead or the invalid byte included in each substructure to the payload is a fixed ratio.

In another possible implementation, the apparatus further includes:

a receiving unit, configured to receive a third OTN frame at the optical layer, and decapsulate the third OTN frame according to the first encapsulation protocol to obtain a fourth OTN frame;

a first decapsulation unit, configured to decapsulate the fourth OTN frame according to the third encapsulation protocol to obtain a fifth OTN frame;

a second decapsulation unit, configured to decapsulate the fifth OTN frame according to the second encapsulation protocol to obtain second service data; and a second sending unit, configured to send the second service data to the client-side device.

In another possible implementation, the first OTN frame is generated by the network device based on first service data from a client side according to a fourth encapsulation protocol. The first switching unit is specifically configured to:

switch a bandwidth of the fourth encapsulation protocol from the first bandwidth to the second bandwidth at a granularity of the specified value; and map the first service data to a payload of the substructure of the first OTN frame according to the fourth encapsulation protocol, and fill the substructure of the first OTN frame with an overhead or an invalid byte according to the fourth encapsulation protocol, so that a ratio of the overhead or the invalid byte included in each substructure to the payload is a fixed ratio.

In another possible implementation, the apparatus further includes:

a receiving unit, configured to receive a sixth OTN frame at the optical layer, and decapsulate the sixth OTN frame according to the first encapsulation protocol to obtain a seventh OTN frame;

a third decapsulation unit, configured to decapsulate the seventh OTN frame according to the fourth encapsulation protocol to obtain third service data; and a second sending unit, configured to send the third service data to the client-side device.

In another possible implementation, when the first bandwidth is greater than the second bandwidth, the apparatus further includes:

a second switching unit, configured to switch the first encapsulation protocol and the optical layer from the first bandwidth to the second bandwidth after the network device switches the first optical transport network OTN frame from the first bandwidth to the second bandwidth at the granularity of the substructure.

In another possible implementation, when the first bandwidth is less than the second bandwidth, the apparatus further includes:

a second switching unit, configured to switch the first encapsulation protocol and the optical layer from the first bandwidth to the second bandwidth before the network device switches the first optical transport network OTN frame from the first bandwidth to the second bandwidth at the granularity of the substructure.

In another possible implementation, the specified value is 25 gigabits per second. The first bandwidth is an integer multiple of 100 gigabits per second, and the second bandwidth is an integer multiple of 100 gigabits per second.

According to a third aspect, an optical transport network cross-connect device is provided. The optical transport network cross-connect device includes a transceiver, a processor, and a memory. The transceiver is configured to communicate with another optical transport network cross-connect device. The memory is configured to store a program. The processor is configured to execute the program stored in the memory to control the optical transport network cross-connect device to perform the method according to the first aspect.

According to a fourth aspect, a computer-readable storage medium is provided. The computer-readable storage medium stores a computer program. When the computer program is executed by a processor, the method according to the first aspect is implemented.

According to a fifth aspect, a computer program product including instructions is provided. When the instructions are run on a computer, the computer is enabled to perform the method in the first aspect.

According to a sixth aspect, a chip is provided. The chip includes a processor and a memory. The memory is configured to store a program, and the processor is configured to execute the program stored in the memory to perform the method according to the first aspect.

BRIEF DESCRIPTION OF DRAWINGS

FIG. 6 is a schematic diagram of an ODUC1 structure according to an embodiment of this application;

DESCRIPTION OF EMBODIMENTS

The following clearly describes the technical solutions in the embodiments with reference to the accompanying drawings in the embodiments. It is clearly that, the described embodiments are merely some but not all of the embodiments of this application. All other embodiments obtained by a person of ordinary skill in the art based on the embodiments of this application without creative efforts shall fall within the protection scope of this application.

Figure 1:
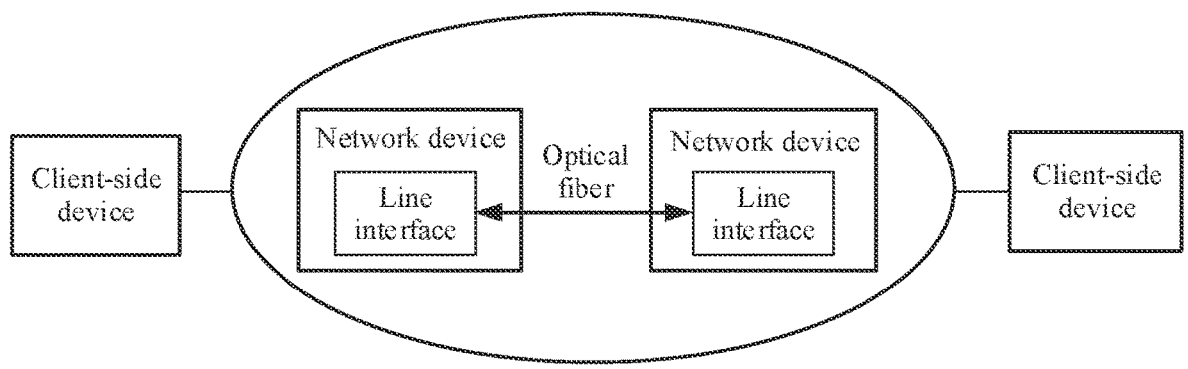
FIG. 1 shows a network architecture of an optical transport network according to an embodiment of this application.

The embodiments of this application provide a method for switching a bandwidth. The method is applied to an optical transport network. A network architecture of the optical transport network is shown in FIG. 1. The optical transport network includes a plurality of network devices. The network devices communicate with each other through optical fibers. In addition, the network devices may further communicate with client-side devices through Ethernet or optical fibers.

Figure 2:
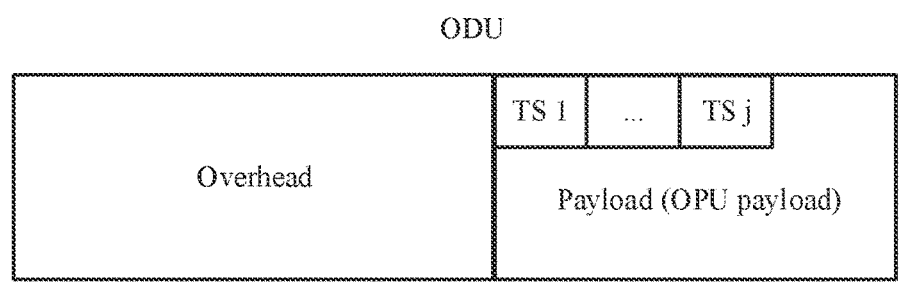
FIG. 2 is a schematic diagram of an ODU frame structure according to an embodiment of this application.

Specifically, service data is encapsulated into an OTN frame according to one or more encapsulation protocols, and transmitted in a form of the OTN frame in the optical transport network. The OTN frame may include one or more of the following: an optical channel payload unit (optical channel payload unit, OPU), an optical channel data unit (optical channel data unit, ODU), an optical channel transport unit (optical channel transport unit, OTU), and the like. A structure of the OPU is used to adapt service data of a client-side device, to implement transmission of the service data from the client side in the optical transport network. Specifically, the service data is mapped to a payload area of the OPU and a mapping overhead is added to constitute an OPU, where the mapping overhead is mainly used for mapping the service data to the OPU payload. An information structure of the ODU is mainly used to support end-to-end data transmission in the optical transport network. Specifically, an ODU overhead is added to the OPU to constitute an ODU, where the ODU overhead is used for end-to-end path monitoring. As shown in FIG. 2, an OPU payload is placed in payload timeslots (TS) 1 to j of the ODU. The OTU is used for point-to-point transmission in the optical transport network, that is, transmission between network devices. Specifically, an OTU overhead and forward error correction (FEC) check information are added to an ODU frame to constitute an OTU frame, where the OTU overhead is used for point-to-point link monitoring.

In the embodiments of this application, a line bandwidth of the optical transport network generally refers to a bandwidth of an OTN frame. The bandwidth of the OTN frame is controlled by an encapsulation protocol of the OTN frame. Therefore, the bandwidth of the OTN frame may also refer to a bandwidth of the encapsulation protocol of the OTN frame. An ODU is used as an example. Generally, a bandwidth of the ODU may be 2.5 Gbit/s, 10 Gbit/s, 40 Gbit/s, 100 Gbit/s, n*100 Gbit/s, or the like. It should be noted that a value of a bandwidth provided in the embodiments of this application is an approximate value of a bandwidth level, and does not represent a specific accurate value. A bandwidth unit may be referred to as G for short in this specification. In addition, in the embodiments of this application, an ODU with a bandwidth of 40 Gbit/s may be named as an ODUXL, an ODU with a bandwidth of 100 Gbit/s may be named as an ODUC, and correspondingly, an ODU with a bandwidth of n*100 Gbit/s may be named as an ODUCn. X, XXV, XL, L, and C are Roman letters and represent 10, 25, 40, 50, and 100 respectively.

Figure 3:
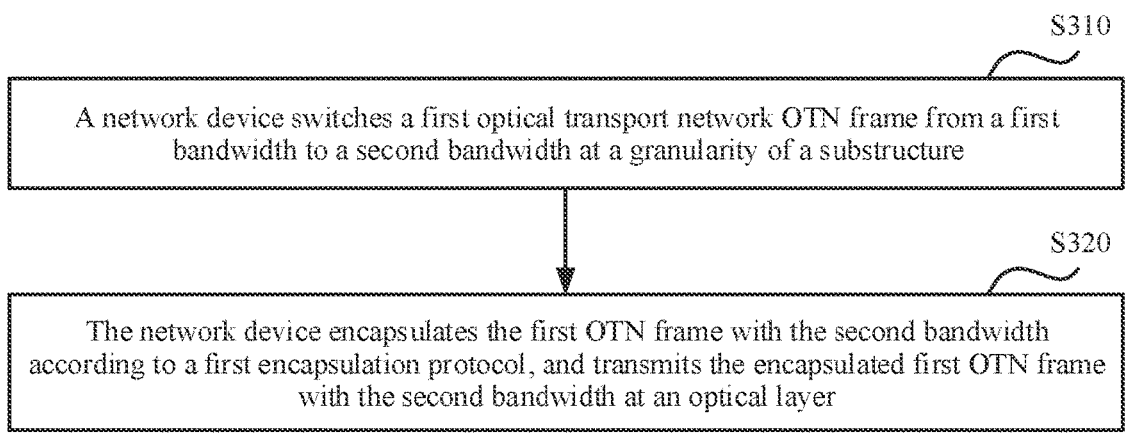
FIG. 3 is a flowchart of a method for switching a line bandwidth of an optical transport network according to an embodiment of this application.

When the OTN frame provided in the embodiments of this application is transmitted in the optical transport network, the bandwidth of the OTN frame may be switched, and services do not need to be interrupted during switching. The following further describes the method for switching the line bandwidth of the optical transport network provided in the embodiments of this application with reference to FIG. 3. As shown in FIG. 3, the bandwidth switching method is applicable to a network device in the optical transport network. The bandwidth switching method may specifically include the following steps. S310: The network device switches a first optical transport network OTN frame from a first bandwidth to a second bandwidth at a granularity of a substructure, where a bandwidth of the substructure is a specified value, and a difference between the first bandwidth and the second bandwidth is one or more specified values. S320. The network device encapsulates the first OTN frame with the second bandwidth according to a first encapsulation protocol, and transmits the encapsulated frame with the second bandwidth at an optical layer.

This embodiment of this application is applicable to a scenario of flexible bandwidth switching. Flexible bandwidth switching is a process in which a transmission bandwidth is increased or decreased without affecting an existing communication service. During communication, whether an optical-layer transmission bandwidth needs to be switched may be determined based on a current optical-layer transmission bandwidth, an actual requirement of a transmission service, and a current optical transmission environment. For example, the current optical-layer transmission bandwidth is 200G, but 100G can meet a requirement of the actual communication service. Therefore, the optical-layer transmission bandwidth needs to be decreased to 100G. For another example, the current optical-layer transmission bandwidth is 100G, the current transmission environment can meet a requirement of 200G, and transmission efficiency of a transmission service can be improved by using the bandwidth of 200G. Therefore, the optical-layer transmission bandwidth needs to be increased to 200G. In addition, the actual requirement of a transmission service may be determined based on service information such as a service type, or indication information of another device. The current optical transmission environment may include a line status of current optical transmission, for example, usage of current transmission resources.

During optical communication, before an OTN frame is transmitted to an optical layer, optical digital signal processing (optical digital signal processing, ODSP) needs to be performed on the OTN frame, so that optical communication performance can be improved through ODSP. There are a plurality of ODSP algorithms. Generally, in a case of a same ODSP algorithm, a smaller bandwidth indicates a longer transmission distance. Therefore, when it is determined whether switching of optical-layer transmission bandwidth needs to be performed, limitation caused by an ODSP algorithm that is to be used to a bandwidth and a transmission distance may be considered.

Figure 4:
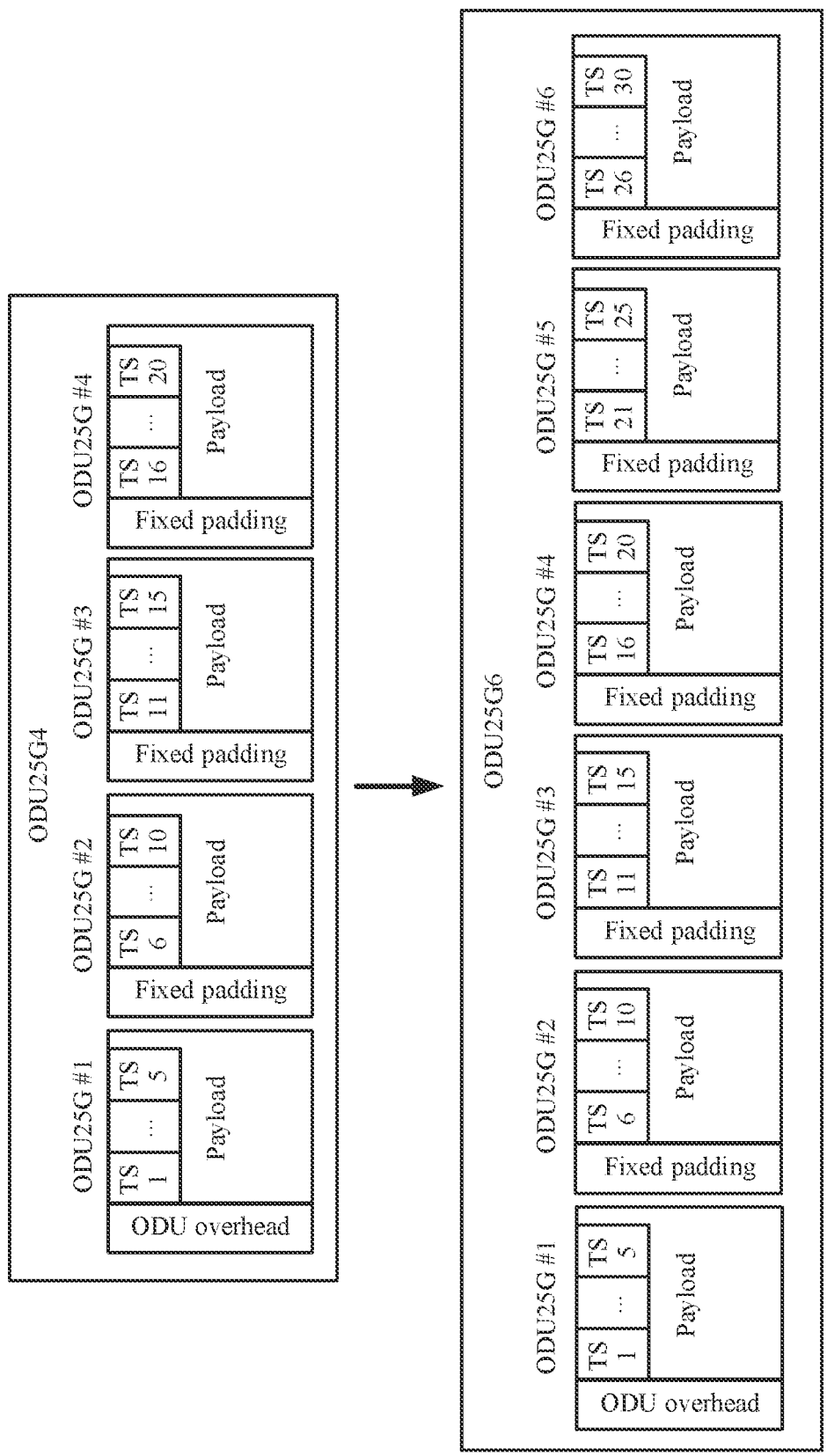
FIG. 4 is a schematic diagram of a method for switching a line bandwidth of an optical transport network according to an embodiment of this application.

When it is determined that bandwidth switching needs to be performed, S310 and S320 are performed. In S310, the first OTN frame may include one or more substructures, where the substructure is a minimum unit for OTN frame adjustment. Bandwidth switching is performed by increasing or decreasing one or more substructures. In addition, each substructure may include two parts: one part is used to encapsulate an overhead or fill an invalid byte, and the other part is a payload. As shown in FIG. 4, an example in which an OTN frame is an ODU and the specified value is 25G is used for description. The substructure of the first OTN frame may be represented as an ODU25G, and each timeslot (TS) is 5G. Correspondingly, an OTN frame with a bandwidth of 100G may be represented as an ODU25G4, where 4 indicates that the ODU25G4 includes four ODUs with 25G (ODU25G 1#, ODU25G 2#, ODU25G 3#, and ODU25G 4#). When a bandwidth is switched from 100G to 150G, that is, when the bandwidth is switched from the ODU25G4 to an ODU25G6, in the ODU25G4, the first part of the first ODU25G may be an ODU overhead, and first parts of the remaining ODUs with 25G may be fixed padding with invalid bytes. A size of an invalid byte may be equal to a size of the ODU overhead. After the ODU25G4 is switched to the ODU25G6, two ODUs with 25G (ODU25G 5# and ODU25G 6#) are added to each OTN frame. In the ODU25G6, a first part of the first ODU25G may be an ODU overhead, and first parts of the remaining ODUs with 25G may be invalid bytes. As shown in FIG. 4, each substructure of the ODU25G4 includes an overhead area and a payload area. The overhead area of each substructure may be overhead padding or fixed padding. The payload area of each substructure may be divided into five timeslots. Each substructure may include or may not include an FEC check area. An overhead area of the first OTN frame is constituted by deleting invalid bytes from the overhead areas of all the substructures, and a payload area of the first OTN frame is constituted by the payload areas of all the substructures.

In some embodiments, the network device may encapsulate at least twice service data sent by the client-side device. First encapsulation may be performed according to a second encapsulation protocol, and is mainly used for end-to-end transmission control. There may be a plurality of types of second encapsulation protocols, for example, an OTN line-side encapsulation protocol. Second encapsulation may be performed according to the first encapsulation protocol, and is mainly used for improving transmission efficiency. There may be a plurality of types of first encapsulation protocols, for example, an encapsulation protocol based on an ODSP algorithm. Based on this, in this embodiment of this application, third encapsulation may be added between the first encapsulation and the second encapsulation. The third encapsulation may be performed according to a third encapsulation protocol. In this case, bandwidth switching processing may be performed during only the third encapsulation, and no change is performed during the first encapsulation. To implement the third encapsulation, the following steps may be performed. The network device determines a second OTN frame, where the second OTN frame is a frame with a third bandwidth, and the second OTN frame is generated by the network device based on first service data from a client side according to the second encapsulation protocol. The network device switches a bandwidth of the third encapsulation protocol from the first bandwidth to the second bandwidth at a granularity of the specified value. The network device maps a payload of the second OTN frame to a payload of the substructure of the first OTN frame according to the third encapsulation protocol, maps an overhead of the second OTN frame to an overhead of the first OTN frame according to the third encapsulation protocol, and fills the substructure of the first OTN frame with an invalid byte according to the third encapsulation protocol, so that a ratio of the overhead or the invalid byte included in each substructure to the payload is a fixed ratio.

Figure 5A:
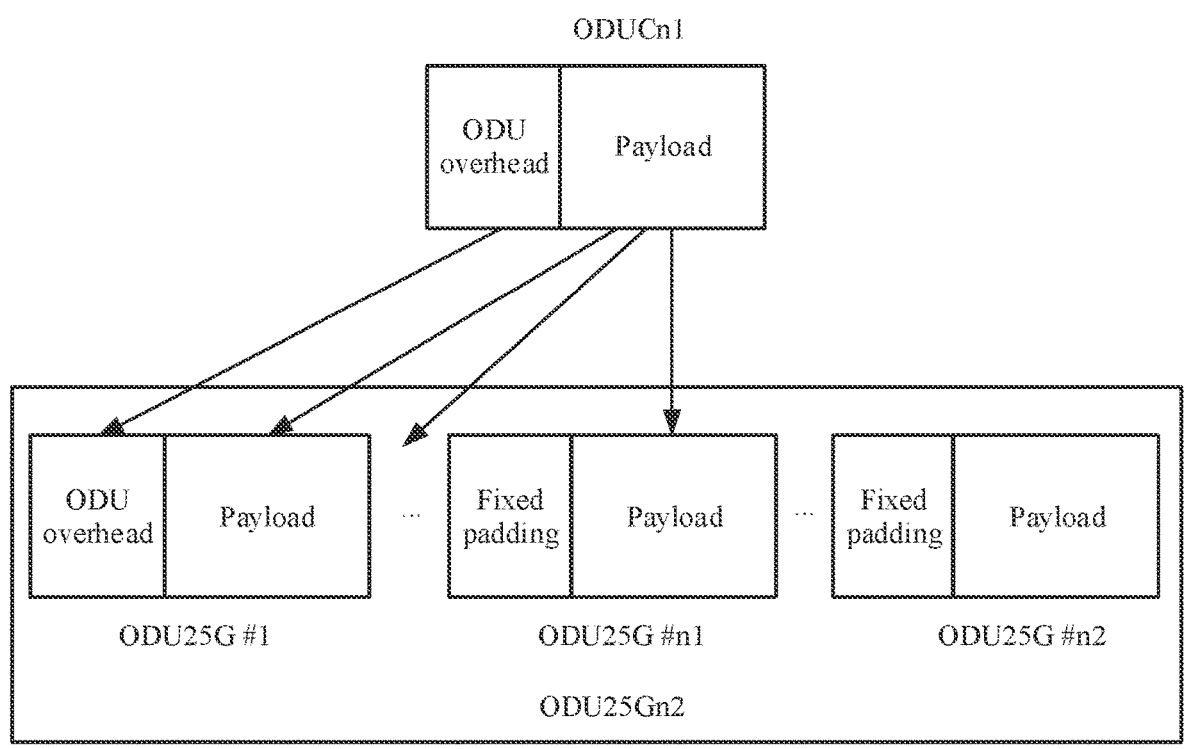
FIG. 5A is a schematic diagram of a mapping process of an ODU25Gn according to an embodiment of this application.
Figure 5B:
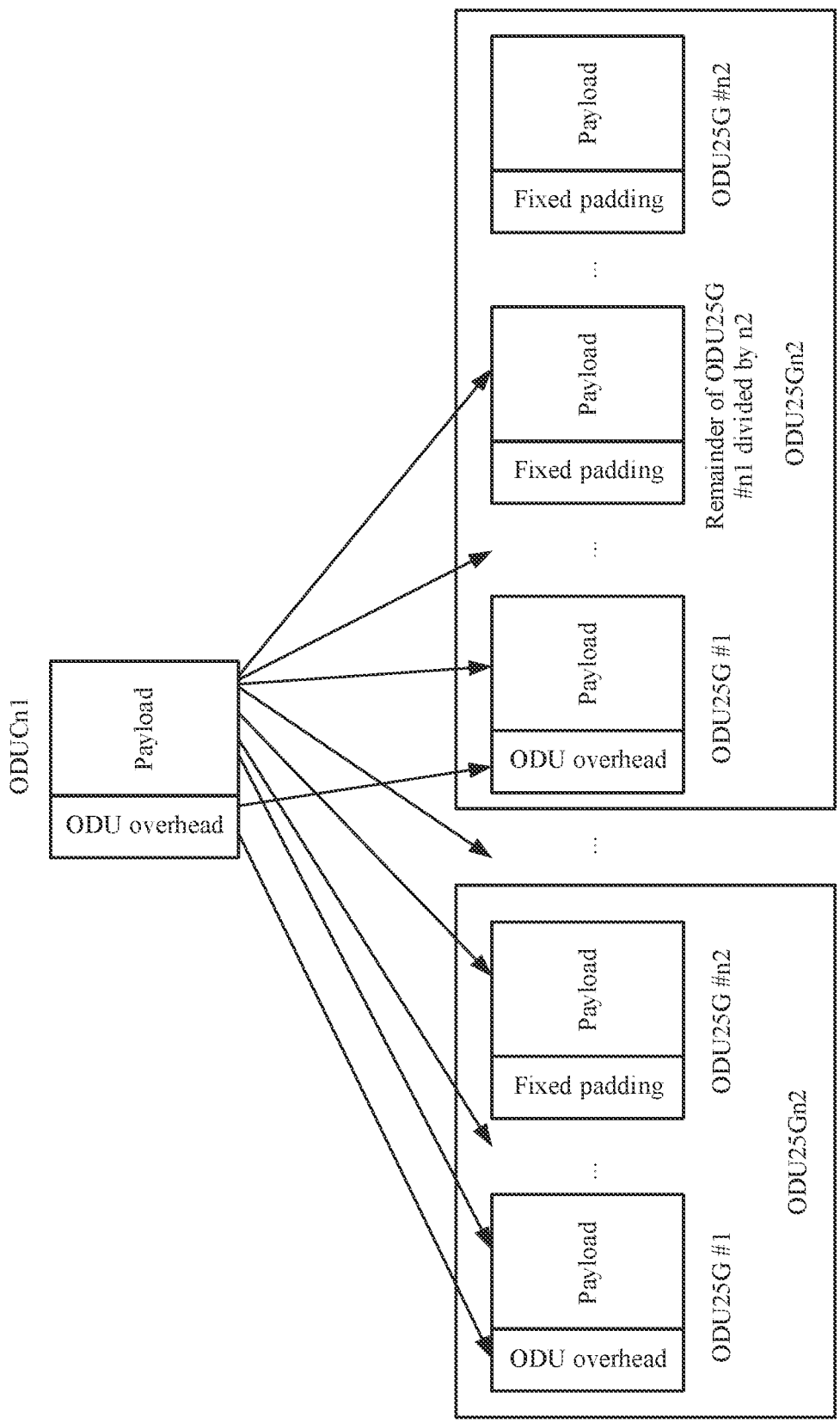
FIG. 5B is a schematic diagram of another mapping process of an ODU25Gn according to an embodiment of this application.

For example, based on the example of the foregoing substructure, the network device may encapsulate the service data sent by the client side into an ODUCn1 for the first time. The network device may map the ODUCn1 to an ODU25Gn2, encapsulates the ODU25Gn2 for the second time, and transmits the encapsulated OTN frame at the optical layer. The third encapsulation protocol may specify a mapping rule between the ODUCn1 and the ODU25Gn2. As shown in FIG. 5A, when 100*n1 is less than 25*n2, an overhead of the ODUCn1 is mapped to an overhead of ODU25G #1, and payloads of the ODUCn1 are mapped to payloads of ODU25G #1 to ODU25G #n1. As shown in FIG. 5B, when 100*n1 is greater than 25*n2, an overhead of the ODUCn1 is mapped to a plurality of ODU25Gn2. A payload of the ODUCn1 is mapped to payloads of substructures of a plurality of ODU25Gn2. When the bandwidth is switched from 25G*n2 to 25G*n3, with reference to FIG. 5A, FIG. 5B, and FIG. 4 (for example, n2 is equal to 4, and n3 is equal to 6; or n2 is equal to 6, and n3 is equal to 4), the network device may map the ODUCn1 to an ODU25Gn3 during the third encapsulation, then encapsulate the ODU25Gn3 for the second time, and transmit the encapsulated OTN frame at the optical layer.

In addition, the network device may further receive an OTN frame sent by another device. The following steps may be specifically included: The network device receives a third OTN frame at the optical layer, and decapsulates the third OTN frame according to the first encapsulation protocol to obtain a fourth OTN frame. The network device decapsulates the fourth OTN frame according to the third encapsulation protocol to obtain a fifth OTN frame. The network device decapsulates the fifth OTN frame according to the second encapsulation protocol to obtain second service data. The network device sends the second service data to the client-side device.

Further, during transmission of the OTN frame, to ensure that a ratio of an overhead to a payload is fixed, an invalid timeslot is usually added to the payload. For example, a payload area of the ODUCn includes two cases in which a padding column is included and a padding column is not included. The padding column includes invalid timeslots. During the third encapsulation, these invalid timeslots may be removed. Based on this, as specified in the third encapsulation protocol, the third encapsulation that is performed in the manner of mapping the payload of the second OTN frame to the payload of the substructure of the first OTN frame may specifically include the following steps. An invalid timeslot in the payload of the second OTN frame is removed, and it is ensured that a value of a bandwidth of remaining timeslots needs to be a multiple of the specified value after the invalid timeslot is removed. For example, a bandwidth of a timeslot is generally 5G, and a specified value is 25G. In this case, a ones place of a quantity of the remaining timeslots is 5 or 0, so that a payload in each substructure corresponds to only one second OTN frame. Next, a payload obtained by removing the invalid timeslot from the second OTN frame is filled into the payload of the substructure of the first OTN frame.

Figure 7:
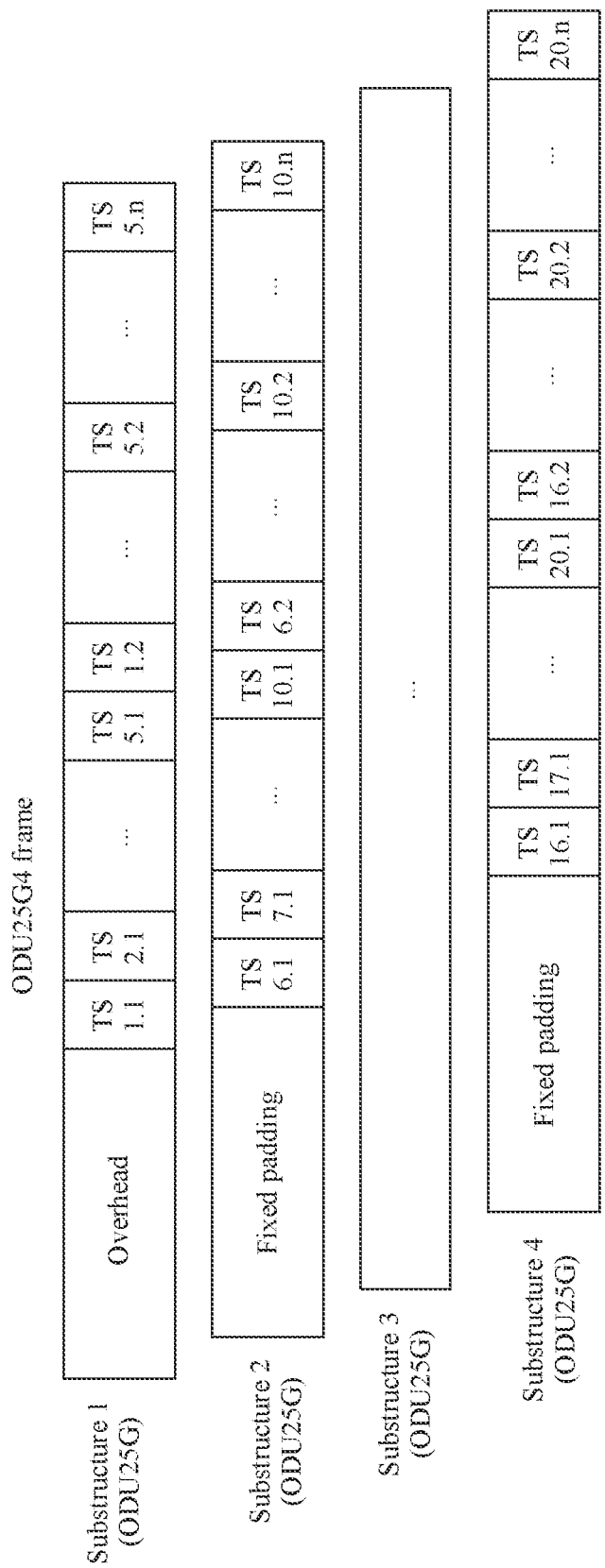
FIG. 7 is a schematic diagram of an ODU25G4 structure according to an embodiment of this application.

For example, FIG. 6 is a schematic diagram of timeslot division in which M=16 bytes (a corresponding quantity of columns is 16) is used as a timeslot interleaving granularity of a payload area of an ODUC1, 20 frames are used as a division period of an OPU payload area, and the payload area of the ODUC1 is successively divided into 20 5-Gbit/s timeslots. Correspondingly, as shown in FIG. 7, in an ODU25G4, M=16 bytes (a corresponding quantity of columns is 16) is used as a timeslot interleaving granularity of a payload area of each substructure timeslot, 20 frames are used as a division period, and a payload area of an ODU25G is successively divided into five 5-Gbit/s timeslots. A number TS A·B (where A=1 . . . n indicates a number of a timeslot, and B=1 . . . 20 indicates a number of a quantity of times of timeslot interleaving). It should be noted that the foregoing frame structure is described by using an ODU frame structure as an example. Because the OPU, the ODU, and the OTU may be obtained from each other through encapsulation, frame structures of the ODU and the OPU may be derived based on the OTU frame structure provided in this embodiment of the present invention. Details are not described in this embodiment of the present invention. In addition, in an implementation of a preset byte, M represents a width of a processing bus of a logic implementation circuit of the network device, for example, M is 16 bytes, 64 bytes, 128 bytes, 256 bytes, or the like.

In some embodiments, the network device may encapsulate at least twice service data sent by the client-side device. First encapsulation may be performed according to a fourth encapsulation protocol, and is mainly used for end-to-end transmission control. There may be a plurality of types of fourth encapsulation protocols, for example, an ODU25Gn encapsulation protocol. Second encapsulation may be performed according to the first encapsulation protocol, and is mainly used for improving transmission efficiency. There may be a plurality of types of first encapsulation protocols, for example, an ODSP algorithm. Based on this, the first OTN frame is generated by the network device based on the first service data from the client side according to the fourth encapsulation protocol. That the network device switches a first optical transport network OTN frame from a first bandwidth to a second bandwidth at a granularity of a substructure may be implemented in the following manner: The network device switches a bandwidth of the fourth encapsulation protocol from the first bandwidth to the second bandwidth at a granularity of the specified value. The network device maps the first service data to a payload of the substructure of the first OTN frame according to the fourth encapsulation protocol, and fills the substructure of the first OTN frame with an overhead or an invalid byte according to the fourth encapsulation protocol, so that a ratio of the overhead or the invalid byte included in each substructure to the payload is a fixed ratio.

In addition, the network device may further receive an OTN frame sent by another device. The following steps may be specifically included: The network device receives a sixth OTN frame at the optical layer, and decapsulates the sixth OTN frame according to the first encapsulation protocol to obtain a seventh OTN frame. The network device decapsulates the seventh OTN frame according to the fourth encapsulation protocol to obtain third service data. The network device sends the third service data to the client-side device.

In some embodiments, line bandwidth switching of an optical transport network may include electrical-layer bandwidth switching and optical-layer bandwidth switching, where electrical-layer bandwidth switching may refer to bandwidth switching corresponding to the first encapsulation protocol to the fourth encapsulation protocol. During bandwidth switching, it needs to be ensured that an optical-layer bandwidth needs to be greater than or equal to a bandwidth of the first encapsulation protocol and that the bandwidth of the first encapsulation protocol is greater than or equal to a bandwidth of the fourth encapsulation protocol, or it needs to be ensured that an optical-layer bandwidth needs to be greater than or equal to a bandwidth of the first encapsulation protocol and that the bandwidth of the first encapsulation protocol is greater than or equal to a bandwidth of the third encapsulation protocol. Based on this, when the first bandwidth before the switching is greater than the second bandwidth after the switching, after the network device switches the first optical transport network OTN frame from the first bandwidth to the second bandwidth at the granularity of the substructure, the method further includes: The network device switches the first encapsulation protocol and the optical layer from the first bandwidth to the second bandwidth. When the first bandwidth before the switching is less than the second bandwidth after the switching, before the network device switches the first optical transport network OTN frame from the first bandwidth to the second bandwidth at the granularity of the substructure, the method further includes: The network device switches the first encapsulation protocol and the optical layer from the first bandwidth to the second bandwidth. In this case, an electrical-layer bandwidth is less than the optical-layer bandwidth, and invalid padding is inserted at a location of an idle bandwidth.

In addition, the network device in the optical transport network may initiate a request for adding or deleting a substructure to a peer network device. The addition request carries a request type and a quantity of substructures that are requested to be added. For example, when two ODUs with 25G are requested to be added, the request carries an identifier [Req_Add, ODU25G 2]. After receiving the corresponding addition request from the peer end, the network device sends a response to the addition request to the peer end. For example, the response carries an identifier [ACK, ODU25G 2]. After receiving the response to the addition request from the peer end, the local end initiates an addition implementation indication, to indicate that the local end is to add, after sending the addition implementation indication, a corresponding substructure to bear a service. For example, the implementation indication request carries an identifier [do_Add, ODU25G 2]. After receiving the corresponding addition implementation indication from the peer end, the local end extracts the service from the corresponding added substructure, and sends a response to the addition implementation indication to the peer end. For example, the response carries an identifier [ACK, ODU25G 2]. After the response to the addition implementation indication is received from the peer end, it indicates that the added substructure is losslessly added, and the service is losslessly borne.

According to this embodiment of this application, data transmission can be performed at a relatively small-granularity bandwidth level on a line side, and further flexible bandwidth switching can be implemented. This improves bandwidth switching efficiency and service communication efficiency.

Figure 8:
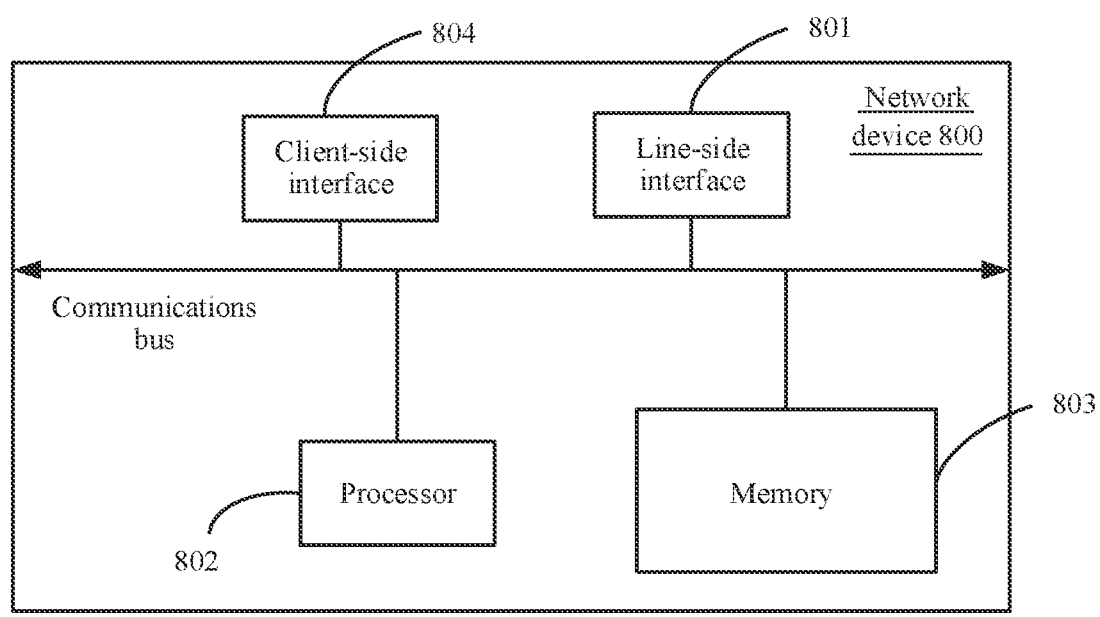
FIG. 8 is a schematic structural diagram of a network device according to an embodiment of this application.

FIG. 8 is a schematic structural diagram of a network device according to an embodiment of this application. As shown in FIG. 8, a network device 800 specifically includes: a line-side interface 801, a processor 802, a memory 803, and a client-side interface 804. The modules may be connected through a bus.

The line-side interface 801 is configured to send or receive an optical signal, to implement optical communication with a network device. The client-side interface is configured to communicate with a client-side device. The memory 803 is configured to store program code and data of the network device. The processor 802 may control the network device to perform a processing process related to the network device in FIG. 3 and/or another process used in the technology described in this application.

Specifically, the line-side interface 801 may include an OTN line processing module, an ODSP module, a digital-to-analog/analog-to-digital conversion module, and the like. The OTN line processing module is mainly configured to complete related processing of an OTN protocol (for example, including the first encapsulation process in the embodiment shown in FIG. 3). The ODSP module is mainly used to process a digital signal in optical communication (for example, including the second encapsulation process and the third encapsulation process in the embodiment shown in FIG. 3). The digital-to-analog/analog-to-digital conversion module is mainly configured for optical-to-electrical conversion. Based on this, an example in which processing that needs to be performed at the line-side interface of the network device in an end-to-end output transmission process is used for description.

Figure 9:
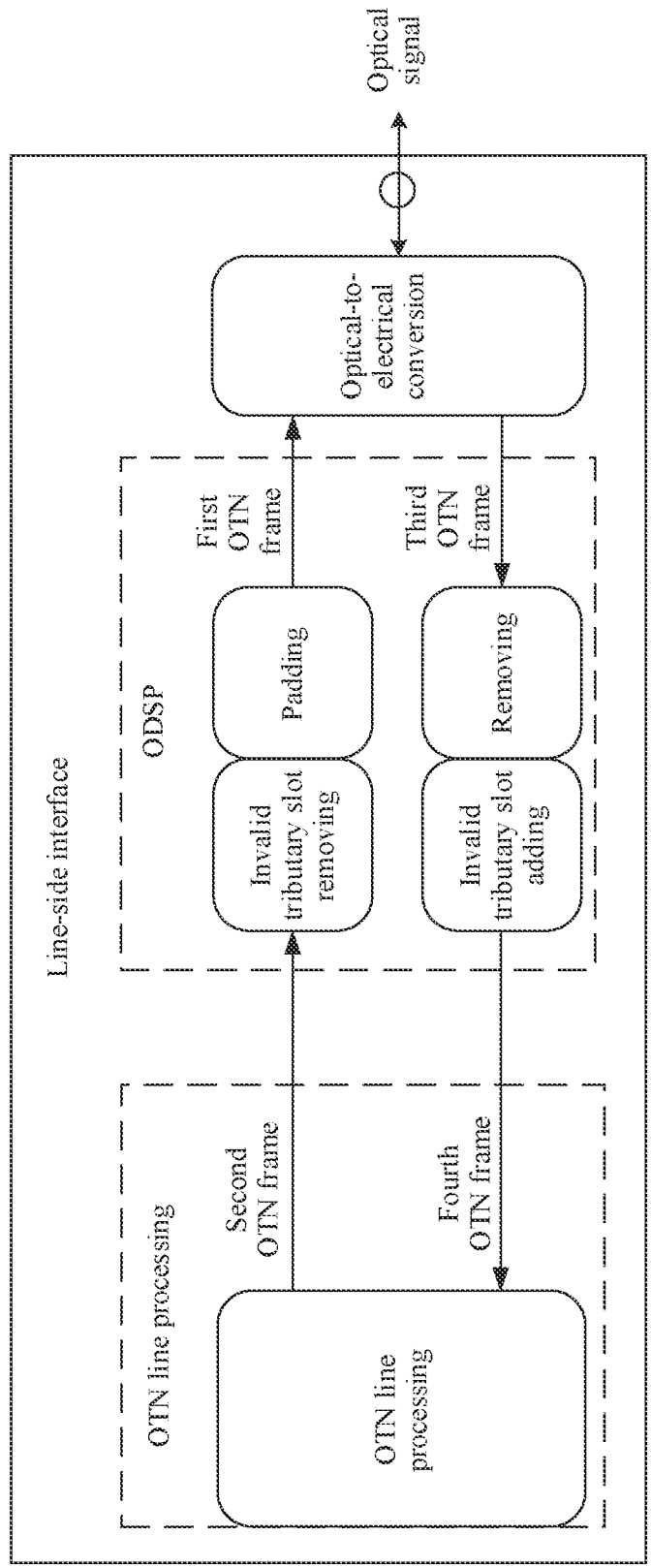
FIG. 9 is a schematic diagram of an optical transport process according to an embodiment of this application.

In some embodiments, as shown in FIG. 9, a process in which the line-side interface sends data is as follows:

The OTN line processing module receives service data from the processor, and performs related processing of a second encapsulation protocol on the service data to constitute a second OTN frame, where the related processing of the second encapsulation protocol may include framing, overhead addition, multiplexing, and the like. The OTN line processing module outputs the second OTN frame to the ODSP module.

After receiving the second OTN frame, the ODSP module may remove an invalid timeslot from a payload of the second OTN frame and reserve an overhead to obtain a second OTN-m, where m represents a quantity of payload timeslots obtained by removing the invalid timeslot from the second OTN frame. For example, one ODUC1 has 20 timeslots, and a bandwidth of each timeslot is 5 Gbit/s, and a value of m may be 15 after five invalid timeslots are removed.

Next, that the ODSP module encapsulates the second OTN frame according to the third encapsulation protocol specifically includes the following process: The ODSP module splits the OTN-m into n parts at a granularity of a substructure, encapsulates the n parts into payload areas of substructures of the first OTN frame respectively, encapsulates an overhead of the second OTN frame is encapsulated into an overhead area of a substructure of the first OTN frame, and fills an overhead area of a substructure of another first OTN frame with fixed padding, to obtain the first OTN frame, where the fixed padding may be an invalid byte.

The ODSP module encapsulates the first OTN frame according to the first encapsulation protocol, and outputs the first OTN frame to the digital-to-analog conversion module. The digital-to-analog conversion module converts the encapsulated frame into an optical signal for output.

A process in which the line-side interface receives data is as follows:

The analog-to-digital conversion module converts the received optical signal into an electrical signal, and sends the electrical signal to the ODSP module.

The ODSP module needs to perform encapsulation according to the first encapsulation protocol and the third encapsulation protocol. Specifically, the ODSP module performs alignment on the third OTN frame through searching, and deletes fixed padding from the third OTN frame to obtain a fourth OTN-m. Next, the ODSP module fills the OTN-m with an invalid timeslot to obtain a fourth OTN frame, and sends the fourth OTN frame to the OTN line processing module.

The OTN line processing module decapsulates the fourth OTN frame according to the second encapsulation protocol to obtain service data, where decapsulation may include deframing, overhead termination, demultiplexing, and the like. The OTN line processing module sends the service data to the processor 802, and the processor 802 sends the service data to the client-side device through the client-side interface 804.

During bandwidth switching, increasing or decreasing of a bandwidth mainly includes two parts: increasing or decreasing of an optical-layer bandwidth and a bandwidth of the first encapsulation protocol, and increasing or decreasing of a bandwidth of the third encapsulation protocol or the fourth encapsulation protocol.

For example, a process of increasing a bandwidth in a case in which the specified value is 25G is performed as follows.

The optical-layer bandwidth and the bandwidth of the first encapsulation protocol may be increased at a granularity of 25G. In this case, an electrical-layer bandwidth is less than the optical-layer bandwidth, and invalid padding is inserted at a location of an idle bandwidth.

Then, increasing of the bandwidth of the third encapsulation protocol mainly includes two processes: increasing of a bandwidth of a second OTN-m, and increasing of a bandwidth of the first OTN frame.

Increasing of the bandwidth of the second OTN-m is performed as follows: Before switching, a timeslot is removed from the second OTN frame to constitute a second $OTN\text{-}m_1$; and after switching, a timeslot is removed from the second OTN frame to constitute a second $OTN\text{-}m_2$, where $m_2$ is greater than $m_1$. The first byte of a frame header of the second OTN frame is used as a switching point to start switching, and a timeslot that is not added or deleted is not affected during addition and removing, $m_2$ and $m_1$ may equally proportionally increase, and an increased ratio may correspond to a ratio of a bandwidth before switching to a bandwidth after switching. For example, if the bandwidth before switching is 100G, and the bandwidth after switching is 150G, $m_2$ may be 1.5 times of $m_1$.

Increasing of the bandwidth of the first OTN frame is performed as follows: The bandwidth may be increased at the granularity of the substructure, and the first byte of a frame header of the first OTN frame is used as a switching point to start switching, and a substructure that is not added or deleted is not affected during addition and deletion.

Increasing of the bandwidth of the second OTN-m and increasing of the bandwidth of the first OTN frame may be performed simultaneously.

For example, a process of decreasing a bandwidth in a case in which the specified value is 25G is performed as follows.

The bandwidth of the third encapsulation protocol may be decreased first.

Decreasing of the bandwidth of the second OTN-m is performed as follows: Before switching, a timeslot is removed from the second OTN frame to constitute a second OTN-$m_3$; and after switching, a timeslot is removed from the second OTN frame to constitute a second OTN-$m_4$, where $m_3$ is greater than $m_4$. The first byte of a frame header of the second OTN frame is used as a switching point to start switching, and a timeslot that is not added or deleted is not affected during addition and removing, $m_4$ and $m_3$ may equally proportionally decrease, and a decreased ratio may correspond to a ratio of a bandwidth before switching to a bandwidth after switching. For example, if the bandwidth before switching is 200G, and the bandwidth after switching is 100G, $m_4$ may be 0.5 times of $m_3$.

Decreasing of the bandwidth of the first OTN frame may be performed at a granularity of a substructure, and switching is performed starting at the first byte of a frame header of the first OTN frame, and a substructure on which adding or deletion is not performed is not affected during adding and deletion. After the electrical-layer line-side bandwidth is decreased, the electrical-layer line-side bandwidth is less than the optical-layer bandwidth, and invalid padding is inserted at a location of an idle bandwidth.

Then, the optical-layer bandwidth and the bandwidth of the first encapsulation protocol may be decreased at a granularity of 25G.

Decreasing of the bandwidth of the second OTN-m and decreasing of the bandwidth of the first OTN frame may be performed simultaneously.

Figure 10:
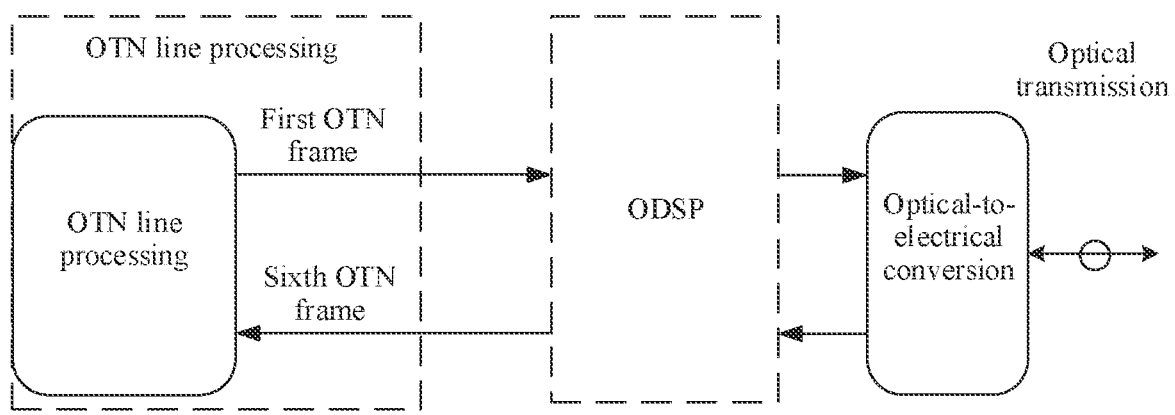
FIG. 10 is a schematic diagram of another optical transport process according to an embodiment of this application.

In some embodiments, with reference to FIG. 10, processing performed at the line-side interface 801 includes the following processes.

A process in which the line-side interface sends data is as follows.

The OTN line processing module receives service data from the processor, performs related processing of the fourth encapsulation protocol on the service data to constitute the first OTN frame, and outputs the first OTN frame to the ODSP module. The ODSP module encapsulates the first OTN frame according to the first encapsulation protocol, and transmits the encapsulated frame to the digital-to-analog conversion module. The digital-to-analog conversion module converts the encapsulated frame into an optical signal for output.

A process in which the line-side interface receives data is as follows:

The analog-to-digital conversion module converts the received optical signal into an electrical signal, and sends the electrical signal to the ODSP module.

The ODSP module needs to perform encapsulation according to the first encapsulation protocol to obtain a sixth OTN frame and send the sixth OTN frame to the OTN line processing module.

The OTN line processing module decapsulates the sixth OTN frame according to the fourth encapsulation protocol to obtain service data, where decapsulation may include deframing, overhead termination, demultiplexing, and the like. The OTN line processing module sends the service data to the processor 802, and the processor 802 sends the service data to the client-side device through the client-side interface 804.

During bandwidth switching, bandwidth increasing or decreasing is directly performed at the ODSP module, the OTN line processing module, and the optical layer based on a substructure.

Figure 11:
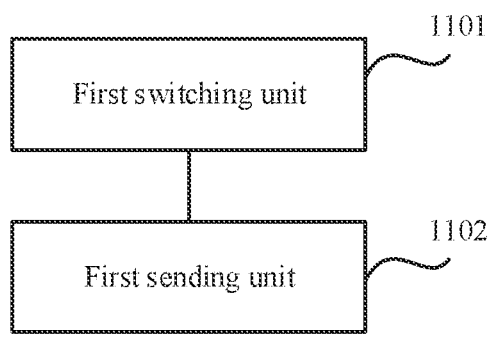
FIG. 11 is a schematic structural diagram of an apparatus for switching a line bandwidth of an optical transport network according to an embodiment of this application.

FIG. 11 is a schematic structural diagram of an apparatus for switching a line bandwidth of an optical transport network according to an embodiment of this application. The apparatus is used in a network device in the optical transport network. As shown in FIG. 11, the apparatus includes:

a first switching unit 1101, configured to switch a first optical transport network OTN frame from a first bandwidth to a second bandwidth at a granularity of a substructure, wherein a bandwidth of the substructure is a specified value, and a difference between the first bandwidth and the second bandwidth is one or more specified values, and a first sending unit 1102, configured to encapsulate a first OTN frame with the second bandwidth according to a first encapsulation protocol, and send the encapsulated frame with the second bandwidth at an optical layer.

In a possible embodiment, the first switching unit 1101 is specifically configured to:

determine a second OTN frame, where the second OTN frame is a frame with a third bandwidth, and the second OTN frame is generated by the network device based on first service data from a client side according to a second encapsulation protocol;

switch a bandwidth of a third encapsulation protocol from the first bandwidth to the second bandwidth at a granularity of the specified value; and map a payload of the second OTN frame to a payload of the substructure of the first OTN frame according to the third encapsulation protocol, map an overhead of the second OTN frame to an overhead of the first OTN frame according to the third encapsulation protocol, and fill the substructure of the first OTN frame with an invalid byte according to the third encapsulation protocol, so that a ratio of the overhead or the invalid byte included in each substructure to the payload is a fixed ratio.

In another embodiment, the apparatus further includes:

a receiving unit, configured to receive a third OTN frame at the optical layer, and decapsulate the third OTN frame according to the first encapsulation protocol to obtain a fourth OTN frame;

a first decapsulation unit, configured to decapsulate the fourth OTN frame according to the third encapsulation protocol to obtain a fifth OTN frame;

a second decapsulation unit, configured to decapsulate the fifth OTN frame according to the second encapsulation protocol to obtain second service data; and a second sending unit, configured to send the second service data to the client-side device.

In another embodiment, the first OTN frame is generated by the network device based on first service data from a client side according to a fourth encapsulation protocol. The first switching unit 1101 is specifically configured to:

switch a bandwidth of the fourth encapsulation protocol from the first bandwidth to the second bandwidth at a granularity of the specified value; and map the first service data to a payload of the substructure of the first OTN frame according to the fourth encapsulation protocol, and fill the substructure of the first OTN frame with an overhead or an invalid byte according to the fourth encapsulation protocol, so that a ratio of the overhead or the invalid byte included in each substructure to the payload is a fixed ratio.

In another embodiment, the apparatus further includes;

a receiving unit, configured to receive a sixth OTN frame at the optical layer, and decapsulate the sixth OTN frame according to the first encapsulation protocol to obtain a seventh OTN frame:

a third decapsulation unit, configured to decapsulate the seventh OTN frame according to the fourth encapsulation protocol to obtain third service data; and a second sending unit, configured to send the third service data to the client-side device.

In another embodiment, when the first bandwidth is greater than the second bandwidth, the apparatus further includes:

a second switching unit, configured to switch the first encapsulation protocol and the optical layer from the first bandwidth to the second bandwidth after the network device switches the first optical transport network OTN frame from the first bandwidth to the second bandwidth at the granularity of the substructure.

In another embodiment, the apparatus further includes:

a second switching unit, configured to switch the first encapsulation protocol and the optical layer from the first bandwidth to the second bandwidth before the network device switches the first optical transport network OTN frame from the first bandwidth to the second bandwidth at the granularity of the substructure.

In another embodiment, the specified value is 25 gigabits per second, the first bandwidth is an integer multiple of 100 gigabits per second, and the second bandwidth is an integer multiple of 100 gigabits per second.

All or some of the foregoing embodiments of this application may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are completely or partially generated. The computer may be a general-purpose computer, a dedicated computer, a computer network, or another programmable apparatus. The computer instructions may be stored in a computer-readable storage medium, or may be transmitted from a computer-readable medium to another computer-readable medium. For example, the computer instructions may be transmitted from a website, a computer, a server, or a data center in a wired (for example, a coaxial cable, an optical fiber, a digital subscriber line (DSL)) manner or a wireless (for example, infrared, radio, or microwave) manner to another website, computer, server, or data center. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconducting medium (for example, a solid state drive (SSD)), or the like.

The foregoing descriptions are merely specific implementations of this application, but the protection scope of this application is not limited thereto. Any variation or replacement that can be readily figured out by the person skilled in the art within the technical scope disclosed in this application shall fall within the protection scope of this application. Therefore, the protection scope of this application shall be subject to the protection scope of the claims.

What is claimed is:

1. A method for switching a line bandwidth of an optical transport network (OTN), wherein the method is applicable to the optical transport network, the optical transport network comprises a plurality of network devices, and the method comprises:

switching, by a network device, an OTN frame from a first bandwidth to a second bandwidth at a granularity of a substructure to generate a first OTN frame with the second bandwidth, wherein a bandwidth of the substructure is a specified value, and a difference between the first bandwidth and the second bandwidth is a multiple of the specified value, and wherein one of the following occurs:

1) Wherein the switching, by a network device, an OTN frame from a first bandwidth to a second bandwidth at a granularity of a substructure to generate a first OTN frame with the second bandwidth comprises:

determining, by the network device, a second OTN frame, wherein the second OTN frame is a frame with a third bandwidth, and wherein the second OTN frame is generated by the network device based on first service data from a client-side device according to a second encapsulation protocol;

switching, by the network device, a bandwidth of a third encapsulation protocol from the first bandwidth to the second bandwidth at a granularity of the specified value;

mapping, by the network device, a payload of the second OTN frame to payloads of substructures of the first OTN frame according to the third encapsulation protocol;

mapping, by the network device, an overhead of the second OTN frame to an overhead of the first OTN frame according to the third encapsulation protocol; and filling, by the network device, the substructures of the first OTN frame with invalid bytes according to the third encapsulation protocol, wherein, in each substructure of the first OTN frame, a ratio of corresponding overhead or corresponding invalid bytes to corresponding payload is a fixed ratio; or 2) Wherein the first OTN frame is generated by the network device based on the first service data from the client-side device according to another encapsulation protocol, and wherein the switching, by a network device, an OTN frame from a first bandwidth to a second bandwidth at a granularity of a substructure to generate a first OTN frame with the second bandwidth comprises:

switching, by the network device, a bandwidth of the another encapsulation protocol from the first bandwidth to the second bandwidth at a granularity of the specified value;
mapping, by the network device, the first service data to payloads of substructures of the first OTN frame according to the another encapsulation protocol; and
filling, by the network device, the substructures of the first OTN frame with an overhead or invalid bytes according to the another encapsulation protocol, wherein in each substructure of the first OTN frame a ratio of corresponding overhead or corresponding invalid bytes to corresponding payload is a fixed ratio; and
encapsulating, by the network device and as an encapsulated frame with the second bandwidth, the first OTN frame with the second bandwidth according to a first encapsulation protocol; and
transmitting, by the network device, the encapsulated frame with the second bandwidth at an optical layer.

2. The method according to claim 1, wherein the method further comprises:
receiving, by the network device, a third OTN frame at the optical layer;
decapsulating, by the network device, the third OTN frame according to the first encapsulation protocol to obtain a fourth OTN frame;
decapsulating, by the network device, the fourth OTN frame according to the third encapsulation protocol to obtain a fifth OTN frame;
decapsulating, by the network device, the fifth OTN frame according to the second encapsulation protocol to obtain second service data; and
sending, by the network device, the second service data to the client-side device.

3. The method according to claim 1, wherein the method further comprises:
receiving, by the network device, a third OTN frame at the optical layer;
decapsulating, by the network device, the third OTN frame according to the first encapsulation protocol to obtain a fourth OTN frame;
decapsulating, by the network device, the fourth OTN frame according to the another encapsulation protocol to obtain third service data; and
sending, by the network device, the third service data to the client-side device.

4. The method according to claim 1, wherein when the first bandwidth is greater than the second bandwidth, after the switching, by the network device, an OTN frame from a first bandwidth to a second bandwidth at a granularity of a substructure, the method further comprises:
switching, by the network device, the first encapsulation protocol and the optical layer from the first bandwidth to the second bandwidth.

5. The method according to claim 1, wherein when the first bandwidth is less than the second bandwidth, before the switching, by the network device, an OTN frame from a first bandwidth to a second bandwidth at a granularity of a substructure, the method further comprises:
switching, by the network device, the first encapsulation protocol and the optical layer from the first bandwidth to the second bandwidth.

6. The method according to claim 1, wherein the specified value is 25 gigabits per second, the first bandwidth is an integer multiple of 100 gigabits per second, and the second bandwidth is an integer multiple of 100 gigabits per second.

7. An apparatus for switching a line bandwidth of an optical transport network (OTN), wherein the apparatus is used in a network device in the optical transport network, and wherein the apparatus comprises:
a non-transitory memory storage comprising computer-executable instructions; and
one or more processors, wherein the one or more processors execute the computer-executable instructions to cause the apparatus to perform operations comprising:
switching an OTN frame from a first bandwidth to a second bandwidth at a granularity of a substructure to generate a first OTN frame with the second bandwidth, wherein a bandwidth of the substructure is a specified value, and a difference between the first bandwidth and the second bandwidth is a multiple of the specified value, and wherein one of the following occurs:
1) Wherein the switching an OTN frame from a first bandwidth to a second bandwidth at a granularity of a substructure to generate a first OTN frame with the second bandwidth comprises:
determining a second OTN frame, wherein the second OTN frame is a frame with a third bandwidth, and wherein the second OTN frame is generated by the network device based on first service data from a client-side device according to a second encapsulation protocol;
switching a bandwidth of a third encapsulation protocol from the first bandwidth to the second bandwidth at a granularity of the specified value;
mapping a payload of the second OTN frame to payloads of substructures of the first OTN frame according to the third encapsulation protocol;
mapping an overhead of the second OTN frame to an overhead of the first OTN frame according to the third encapsulation protocol; and
filling the substructures of the first OTN frame with invalid bytes according to the third encapsulation protocol, wherein, in each substructure of the first OTN frame, a ratio of corresponding overhead or corresponding invalid bytes to corresponding payload is a fixed ratio; or
2) Wherein the first OTN frame is generated by the network device based on the first service data from the client-side device according to another encapsulation protocol, and wherein the switching an OTN frame from a first bandwidth to a second bandwidth at a granularity of a substructure to generate a first OTN frame with the second bandwidth comprises:
switching a bandwidth of the another encapsulation protocol from the first bandwidth to the second bandwidth at a granularity of the specified value;
mapping the first service data to payloads of substructures of the first OTN frame according to the another encapsulation protocol; and
filling the substructures of the first OTN frame with an overhead or invalid bytes according to the another encapsulation protocol, wherein in each substructure of the first OTN frame a ratio of corresponding overhead or corresponding invalid bytes to corresponding payload is a fixed ratio; and encapsulating, as an encapsulated frame with the second bandwidth, the first OTN frame with the second bandwidth according to a first encapsulation protocol; and sending the encapsulated frame with the second bandwidth at an optical layer.

8. The apparatus according to claim 7, wherein the operations further comprise:

receiving a third OTN frame at the optical layer;

decapsulating the third OTN frame according to the first encapsulation protocol to obtain a fourth OTN frame;

decapsulating the fourth OTN frame according to the third encapsulation protocol to obtain a fifth OTN frame;

decapsulating the fifth OTN frame according to the second encapsulation protocol to obtain second service data; and sending the second service data to the client-side device.

9. The apparatus according to claim 7, wherein the operations further comprise:

receiving a third OTN frame at the optical layer;

decapsulating the third OTN frame according to the first encapsulation protocol to obtain a fourth OTN frame;

decapsulating the fourth OTN frame according to the another encapsulation protocol to obtain third service data; and sending the third service data to the client-side device.

10. The apparatus according to claim 7, wherein when the first bandwidth is greater than the second bandwidth, the operations further comprise:

switching the first encapsulation protocol and the optical layer from the first bandwidth to the second bandwidth after switching the OTN frame from the first bandwidth to the second bandwidth at the granularity of the substructure.

11. The apparatus according to claim 7, wherein when the first bandwidth is less than the second bandwidth, the operations further comprise:

switching the first encapsulation protocol and the optical layer from the first bandwidth to the second bandwidth before switching the OTN frame from the first bandwidth to the second bandwidth at the granularity of the substructure.

12. The apparatus according to claim 7, wherein the specified value is 25 gigabits per second, the first bandwidth is an integer multiple of 100 gigabits per second, and the second bandwidth is an integer multiple of 100 gigabits per second.

13. A non-transitory, computer-readable medium storing one or more instructions executable by a computer system to perform operations comprising:

switching, by a network device in an optical transport network (OTN), an OTN frame from a first bandwidth to a second bandwidth at a granularity of a substructure to generate a first OTN frame with the second bandwidth, wherein a bandwidth of the substructure is a specified value, and a difference between the first bandwidth and the second bandwidth is a multiple of the specified value, and wherein one of the following occurs:

1) Wherein the switching, by a network device, an OTN frame from a first bandwidth to a second bandwidth at a granularity of a substructure to generate a first OTN frame with the second bandwidth comprises:

determining, by the network device, a second OTN frame, wherein the second OTN frame is a frame with a third bandwidth, and wherein the second OTN frame is generated by the network device based on first service data from a client-side device according to a second encapsulation protocol;

switching, by the network device, a bandwidth of a third encapsulation protocol from the first bandwidth to the second bandwidth at a granularity of the specified value;

mapping, by the network device, a payload of the second OTN frame to payloads of substructures of the first OTN frame according to the third encapsulation protocol;

mapping, by the network device, an overhead of the second OTN frame to an overhead of the first OTN frame according to the third encapsulation protocol; and filling, by the network device, the substructures of the first OTN frame with invalid bytes according to the third encapsulation protocol, wherein, in each substructure of the first OTN frame, a ratio of corresponding overhead or corresponding invalid bytes to corresponding payload is a fixed ratio; or 2) Wherein the first OTN frame is generated by the network device based on the first service data from the client-side device according to another encapsulation protocol, and wherein the switching, by a network device, an OTN frame from a first bandwidth to a second bandwidth at a granularity of a substructure to generate a first OTN frame with the second bandwidth comprises:

switching, by the network device, a bandwidth of the another encapsulation protocol from the first bandwidth to the second bandwidth at a granularity of the specified value;

mapping, by the network device, the first service data to payloads of substructures of the first OTN frame according to the another encapsulation protocol; and filling, by the network device, the substructures of the first OTN frame with an overhead or invalid bytes according to the another encapsulation protocol, wherein in each substructure of the first OTN frame a ratio of corresponding overhead or corresponding invalid bytes to corresponding payload is a fixed ratio; and encapsulating, by the network device and as an encapsulated frame with the second bandwidth, the first OTN frame with the second bandwidth according to a first encapsulation protocol; and transmitting, by the network device, the encapsulated frame with the second bandwidth at an optical layer.

14. The non-transitory, computer-readable medium of claim 13, wherein the operations further comprise:

receiving, by the network device, a third OTN frame at the optical layer;

decapsulating, by the network device, the third OTN frame according to the first encapsulation protocol to obtain a fourth OTN frame;

decapsulating, by the network device, the fourth OTN frame according to the third encapsulation protocol to obtain a fifth OTN frame;

decapsulating, by the network device, the fifth OTN frame according to the second encapsulation protocol to obtain second service data; and sending, by the network device, the second service data to the client-side device.

* * * * *

UNITED STATES PATENT AND TRADEMARK OFFICE
CERTIFICATE OF CORRECTION

PATENT NO. : 11,570,530 B2
APPLICATION NO. : 17/353373
DATED : January 31, 2023
INVENTOR(S) : Sisi Ou and Zhangwei Lei Page 1 of 1

It is certified that error appears in the above-identified patent and that said Letters Patent is hereby corrected as shown below:

In the Claims

In Column 16, Line 29, in Claim 1, delete "Wherein" and insert -- wherein --.

In Column 16, Line 58, in Claim 1, delete "Wherein" and insert -- wherein --.

In Column 18, Line 19, in Claim 7, delete "Wherein" and insert -- wherein --.

In Column 18, Line 46, in Claim 7, delete "Wherein" and insert -- wherein --.

In Column 19, Line 60, in Claim 13, delete "Wherein" and insert -- wherein --.

In Column 20, Line 23 (Approx.), in Claim 13, delete "Wherein" and insert -- wherein --.

Signed and Sealed this
Twenty-fifth Day of April, 2023

Katherine Kelly Vidal
*Director of the United States Patent and Trademark Office*